United States Patent [19]
Gabriel

[11] 3,966,144
[45] June 29, 1976

[54] DUCT SYSTEM FOR WIND GUST ALLEVIATION OF AIRCRAFT AND SUSPENDED CONTAINERIZED LOADS

[76] Inventor: Edwin Zenith Gabriel, 318-B South St., Eatontown, N.J. 07724

[22] Filed: June 30, 1975

[21] Appl. No.: 584,585

Related U.S. Application Data

[63] Continuation-in-part of Ser. No. 420,154, Nov. 29, 1973, abandoned.

[52] U.S. Cl. ............................................. 244/17.11
[51] Int. Cl.² ............................................. B64D 47/00
[58] Field of Search ............ 244/137 R, 1 R, 17.11, 244/17.15, 17.19, 42 C, 40 R, 76 C, 138 R, 130; 296/1 S

[56] References Cited
UNITED STATES PATENTS

| | | | |
|---|---|---|---|
| 2,518,697 | 8/1950 | Lee | 244/17.19 |
| 3,721,466 | 3/1973 | Abrams | 296/1 S |

*Primary Examiner*—Trygve M. Blix
*Assistant Examiner*—Barry L. Kelmachter

[57] ABSTRACT

Under high wind gust conditions, a containerized load is subject to swaying as it is being hoisted or lowered onto a loading platform. A ductwork arrangement is proposed in which the wind gust itself provides the energy to help maintain the load in a horizontal, level position. This achievement is accomplished in two ways. First, the wind gust hits an array of very light spring-loaded hinged doors specially mounted to deflect the air upward, thus partially alleviating some of its impact. Second, the air, which passes through the door openings, is guided to follow a central overhead duct along with other air from the wind gust to the load's opposite side. The central overhead duct is specially designed to assist in guiding the air to the load's opposite side. A bulged door at each end of the central duct helps direct the air smoothly downward into a depending duct portion to make impact on the load's opposite side. A similar gust alleviation technique is applied to the helicopter itself hovering overhead and suspending the load. In this case the door hinges are mounted above the door instead of below in order for the air to be deflected downward, thus providing additional lift for the aircraft, while simultaneously alleviating wind gust effects by dissipating a portion of the wind to other directions. The duct system consists of two jackets, one mounted on each side of the fuselage. Each jacket has two or more rows of doors, hinged on top, which open inward when wind gusts blow against the fuselage, to help direct the wind gust downward, and thus be expelled through openings which occur along the lower sides of the jackets. This duct system may be used on the helicopter even without a suspended containerized load to enable the craft to fly more safely under gusty conditions.

4 Claims, 31 Drawing Figures

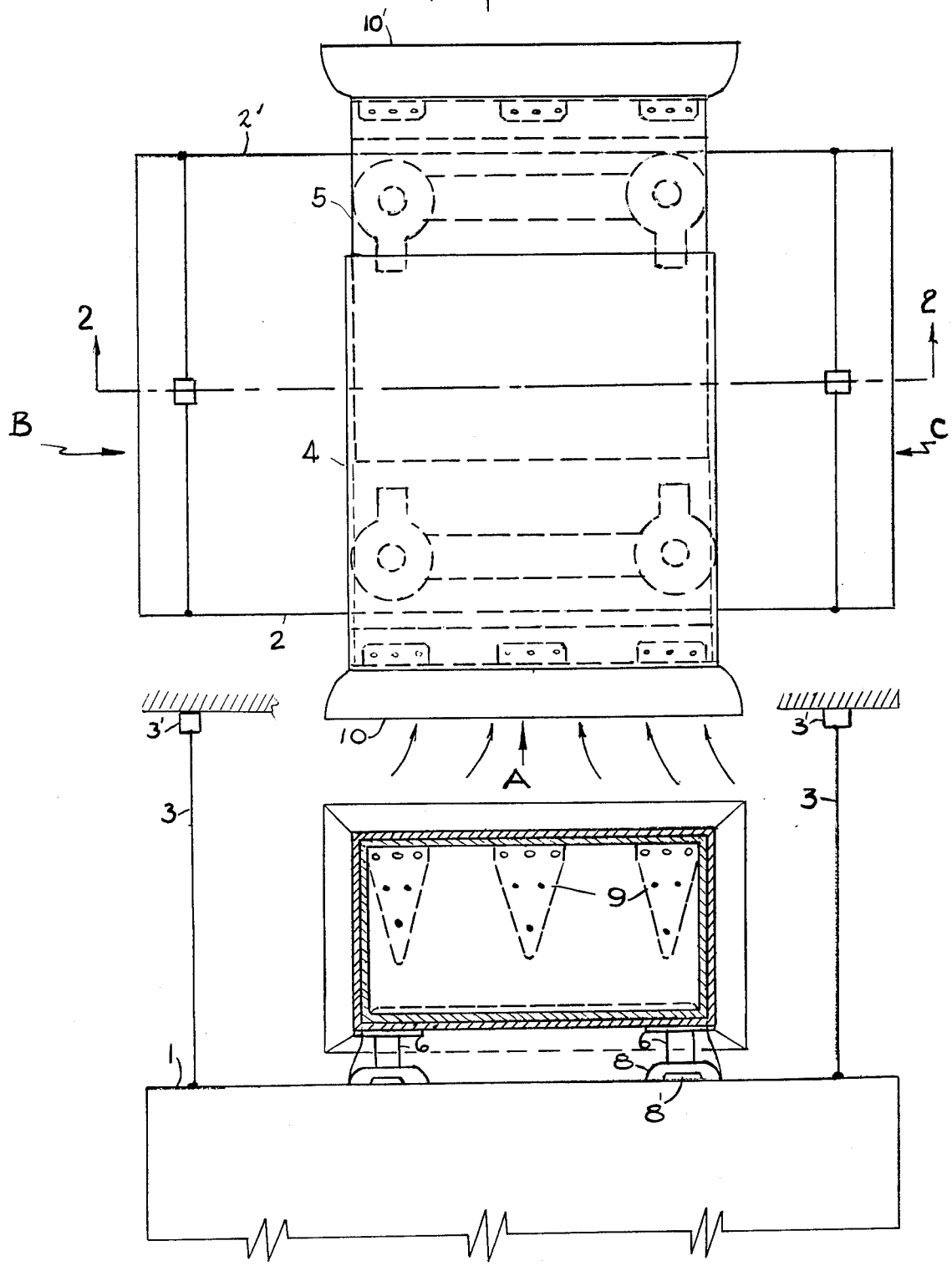

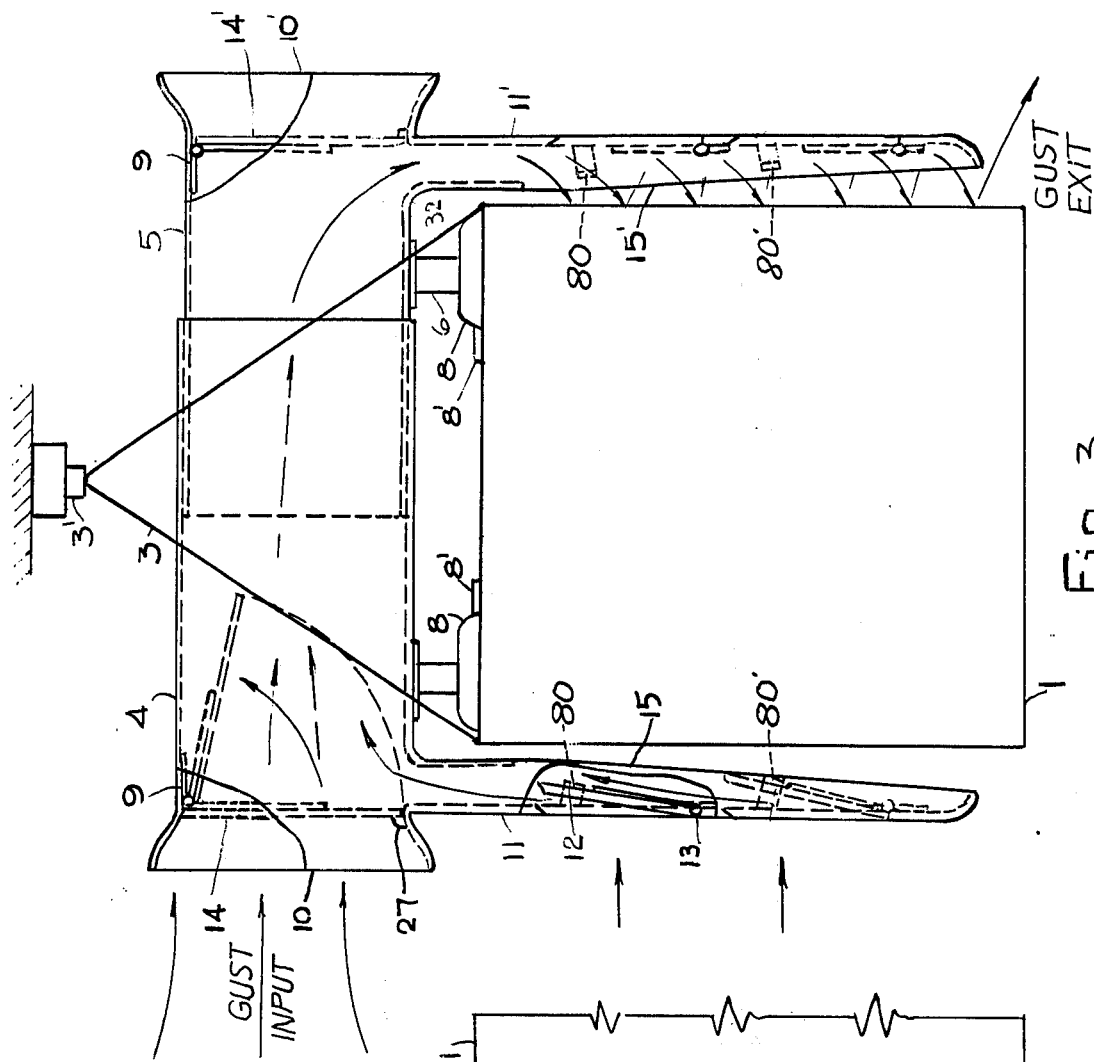
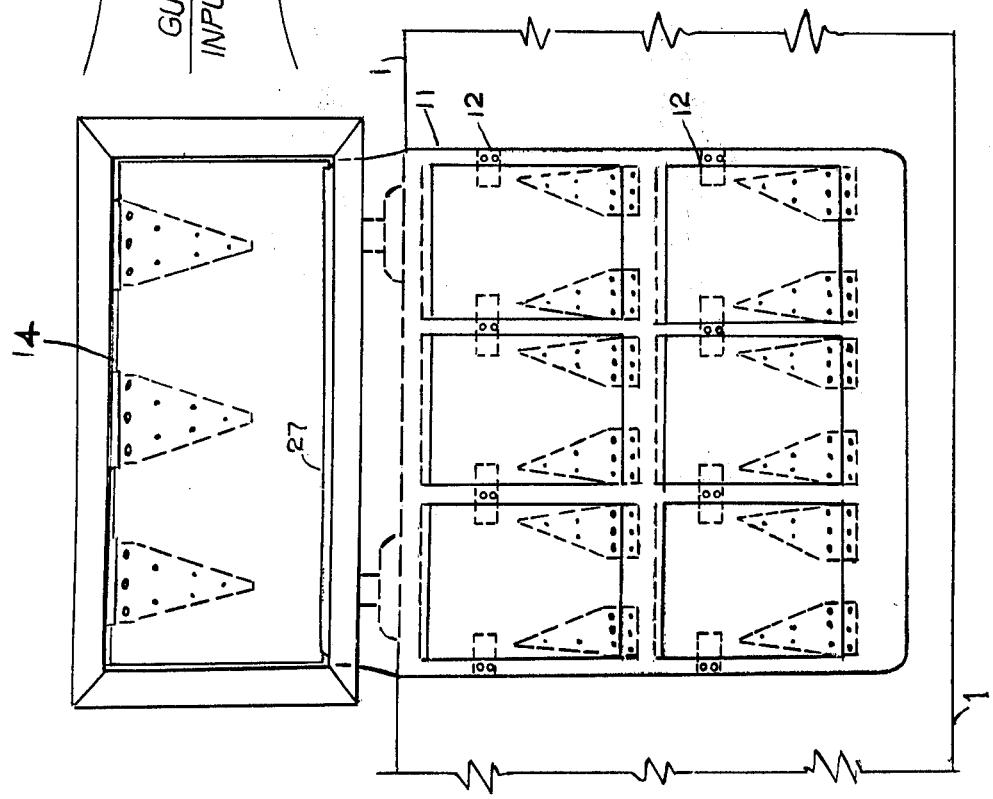

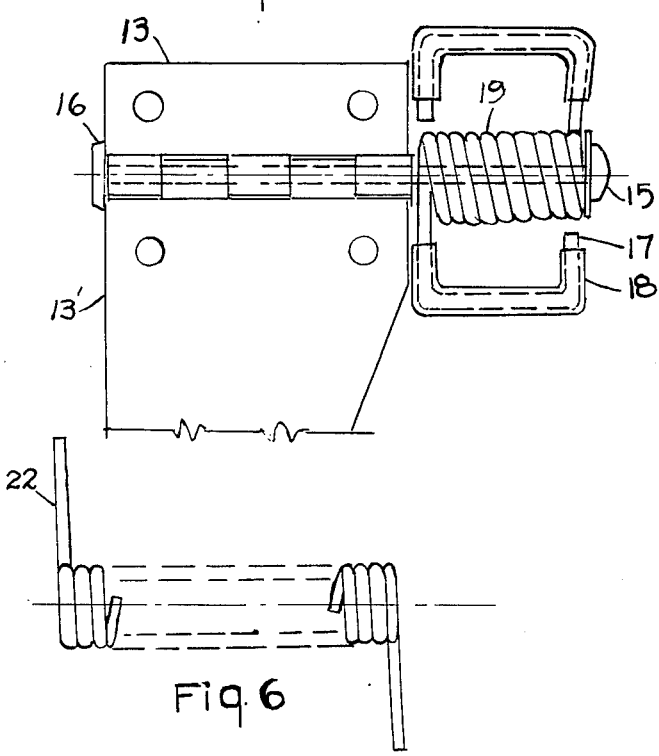
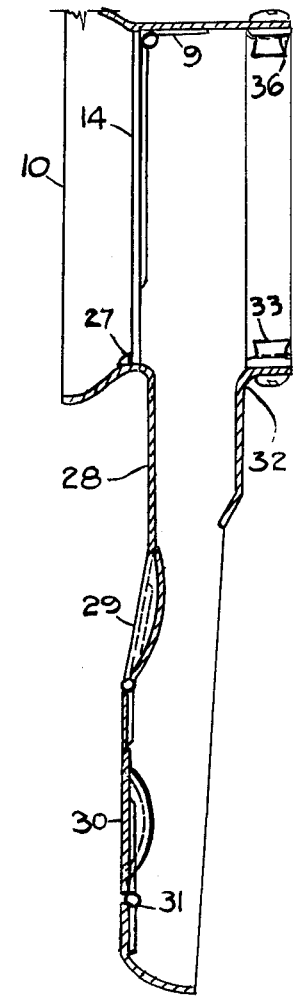
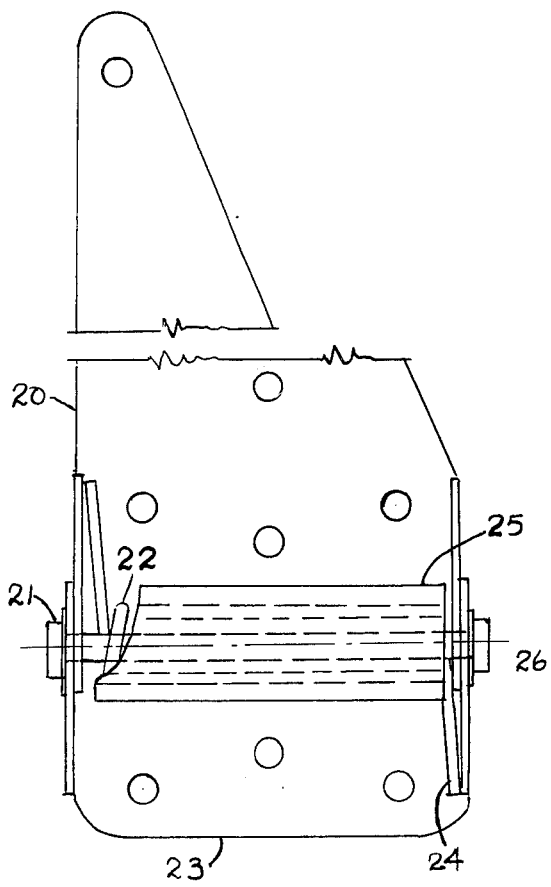
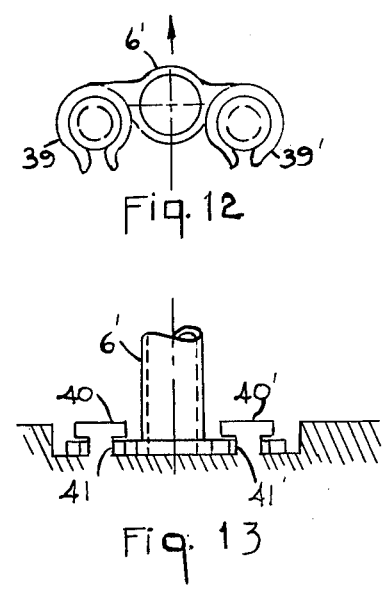

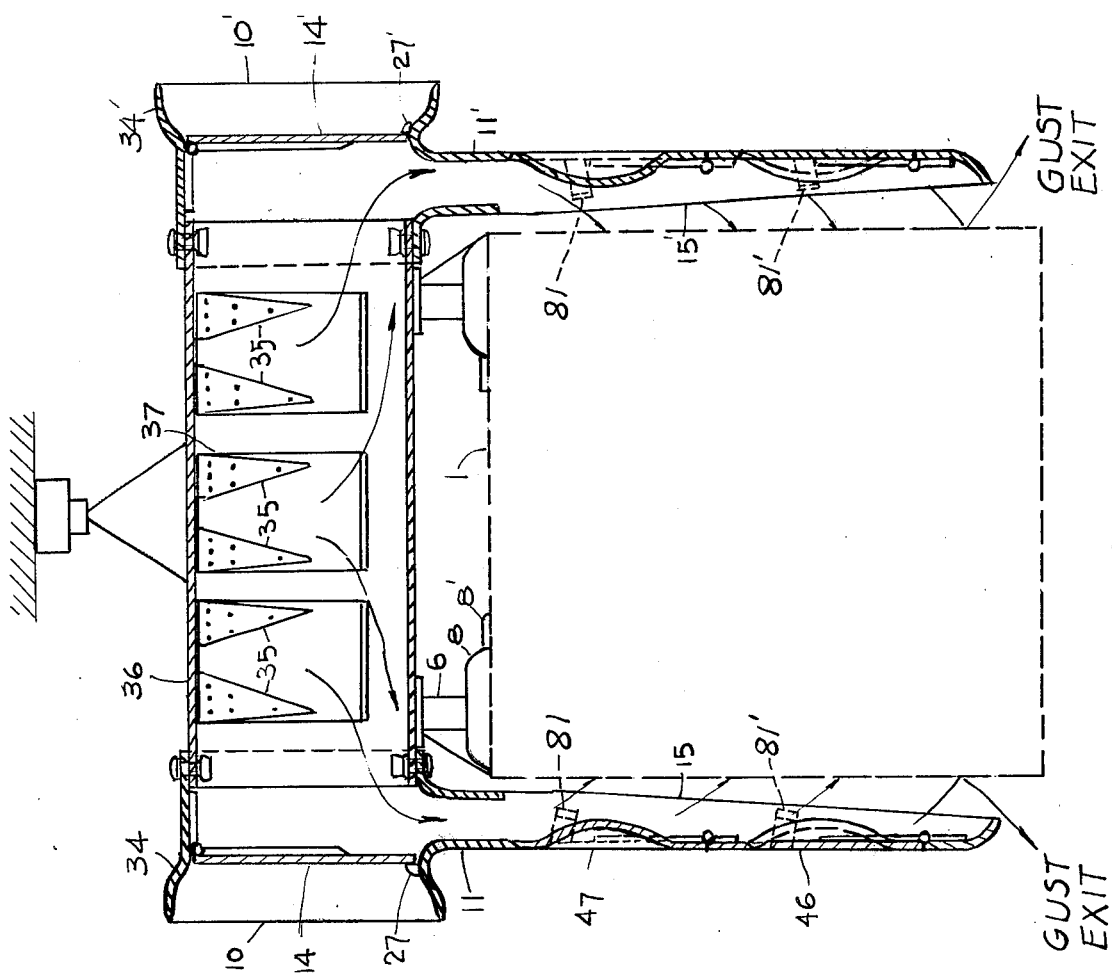
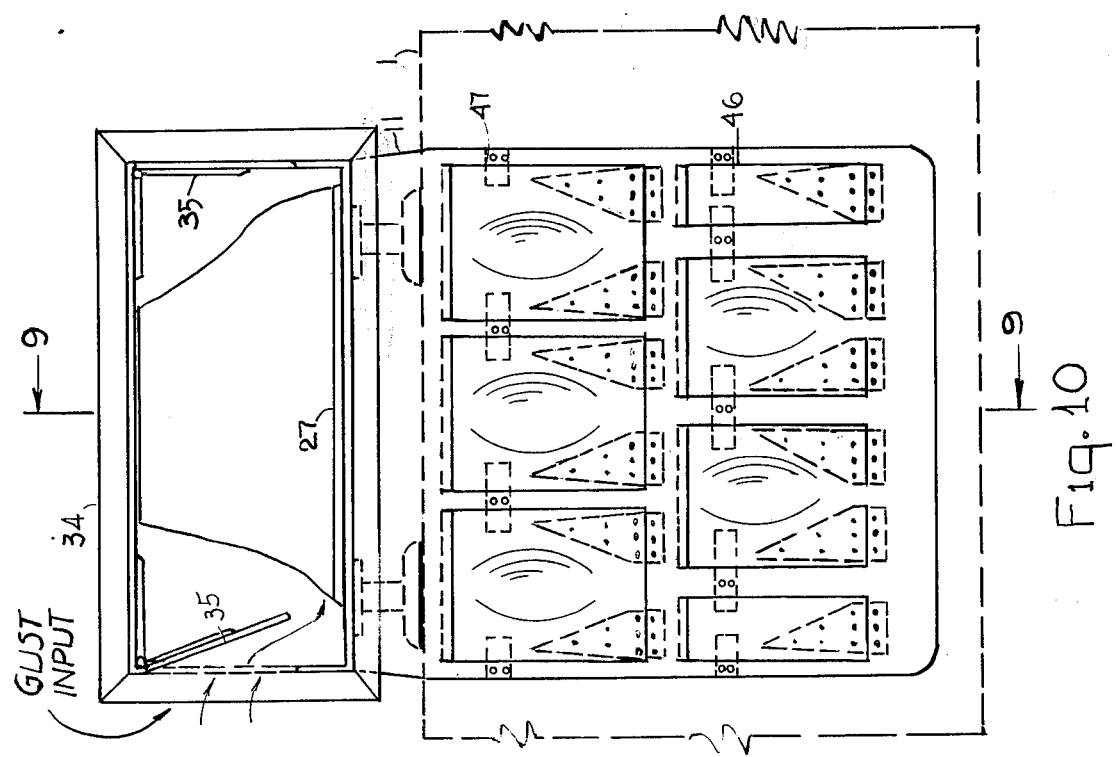

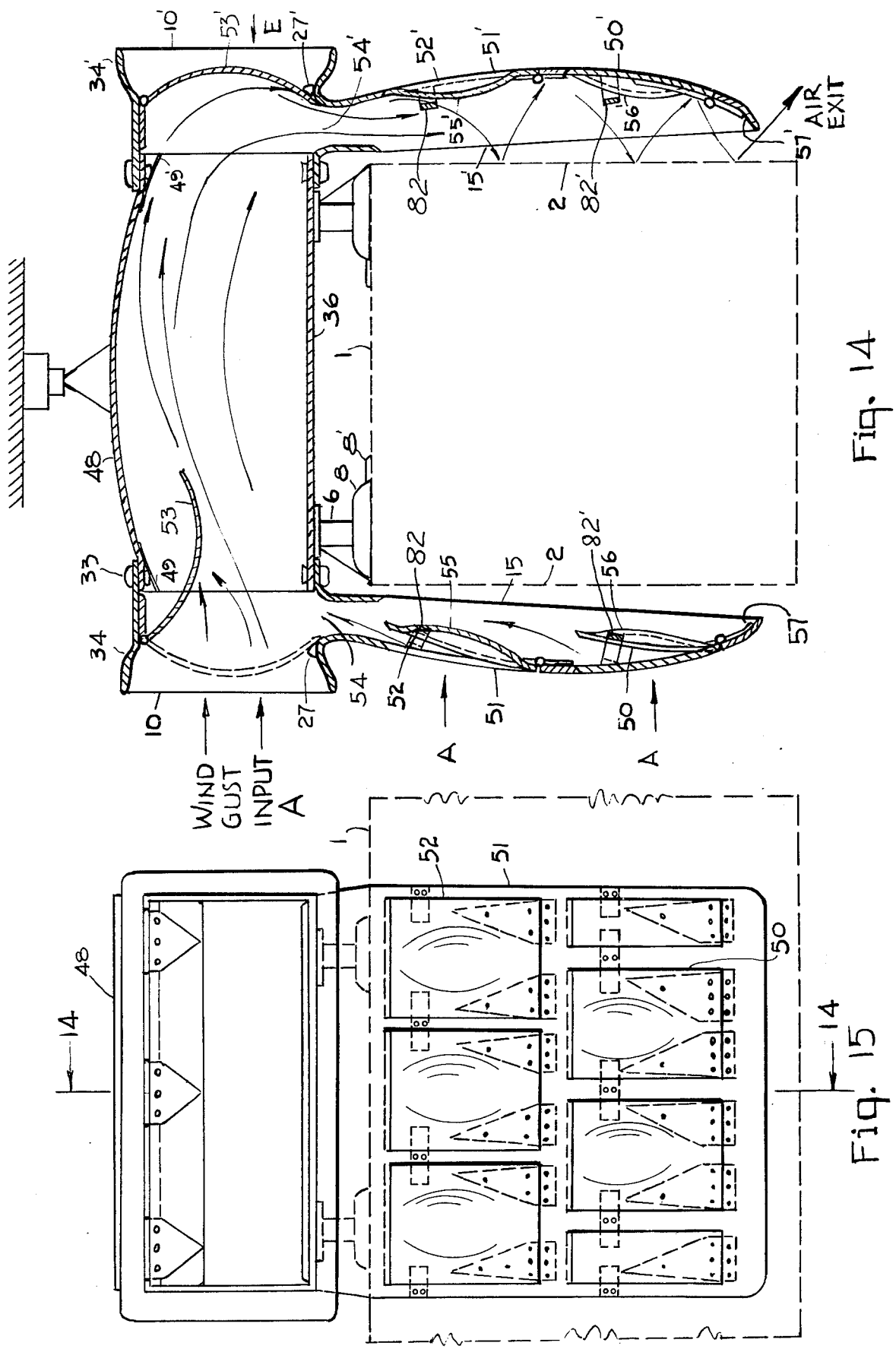

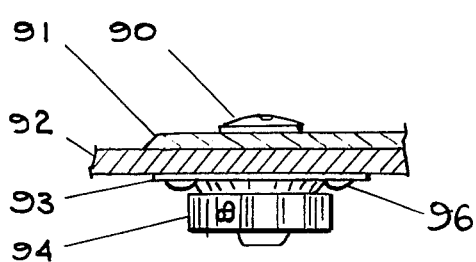
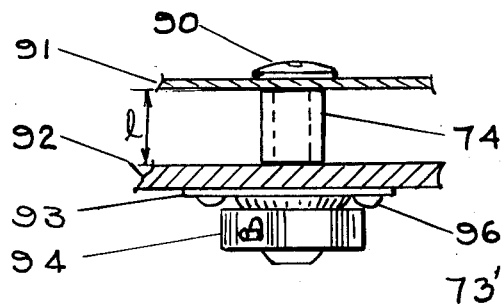
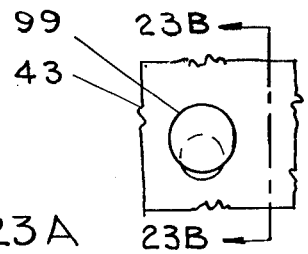
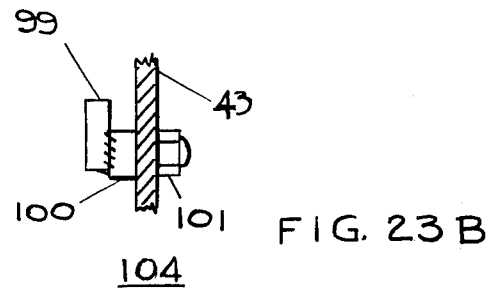
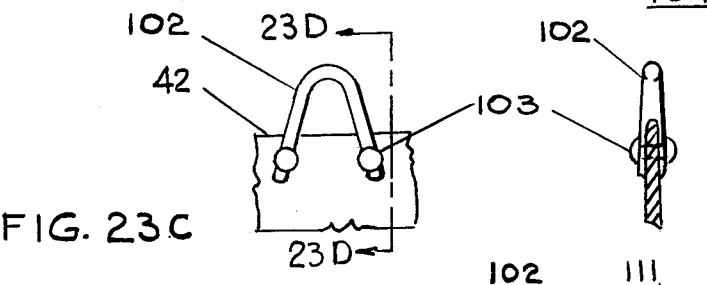
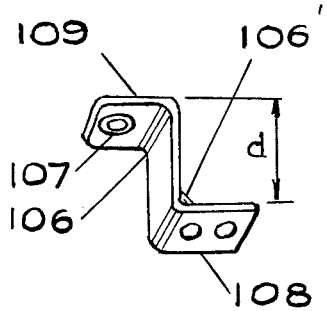
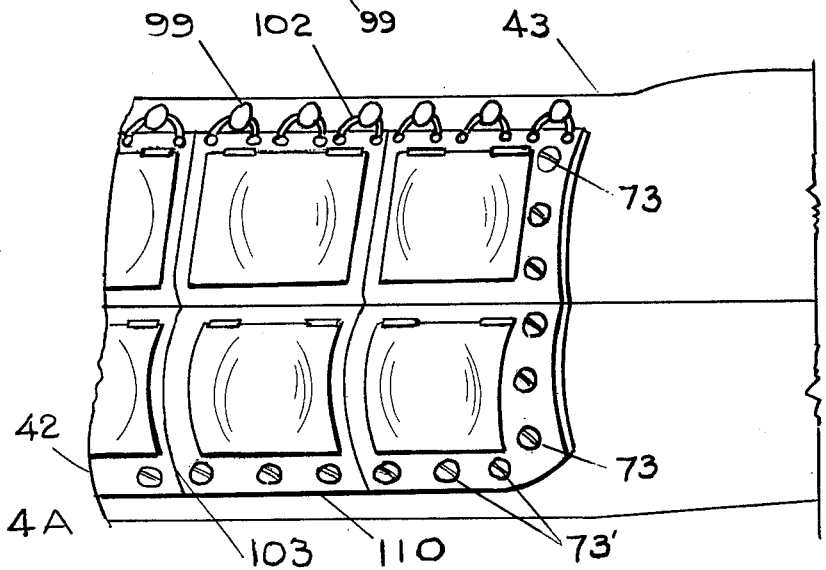

DUCT SYSTEM FOR WIND GUST ALLEVIATION OF AIRCRAFT AND SUSPENDED CONTAINERIZED LOADS

BACKGROUND OF THE INVENTION

This application is a continuation-in-part of my co-pending application Ser. No. 420,154 filed Nov. 29, 1973, now abandoned.

The present invention relates to cargo loading and unloading operations and more particularly to a method and means for wind gust alleviation and reducing the effects of wind gusts on cargo being loaded onto ships, and also on the aircraft itself.

With the advent of vertical take-off aircraft, such as helicopters, and more particularly the heavy lift type of Boeing's and Sikorsky's, there has been a need for both aircraft and suspended cargo wind gust alleviation. Presently, helicopter offshore ship-loading operations must wait for relatively calm days. Under wind gust conditions, the hovering aircraft, the cargo and the ship below move in a combination of a translational and oscillatory manner. For example, in loading a ship, the objective is to precisely place the containerized cargo in a desired position in the ship's hold. In some cases the load placement may call for a ± 4 inch position accuracy from adjacent loads already in place. Placing and finally precisely positioning a load on a loading platform from an overhead suspension system is a difficult feat in itself without the addition of wind gusts to complicate the matter.

Until now no scheme has been devised to enable a vertical take-off aircraft to perform logistic operations under even moderate wind gust conditions. Logistic operations in this case refer to transporting external cargo and then unloading such cargo via a hoisting system involving suspension cables. Much expense and time, especially under emergency conditions, can be saved if helicopters could perform logistic operations under weather conditions not possible now. Undoubtedly, schemes have been devised at least on paper, which attempt to take into account and correct for the effects of wind gusts. However, it is possible that such schemes involve some form of external or internal electrical power, in which case it would be logical to say that there could be additional expense, weight, size and/or maintenance required, not to mention a loss of reliability. The reliability aspect could involve power failure due to wear and tear of mechanical moving parts as well as loss of the power source itself.

In the scheme described herewith, no external power other than the wind gust itself is required. The wind gusts may be produced not only by natural forces, that its, produced by the existence of low pressure weather conditions, but also by man-made or artificial forces, such as by nuclear or other type explosions. Consequently, it is possible for a wind gust to occur under so-called favorable weather conditions. Then, without a gust alleviation system, the very survival of the aircraft itself would be in jeopardy. Hence, the scheme described herewith is submitted as a technique for enabling both the aircraft and its suspended load to "survive" under unexpected wind gust conditions, such as that created by an explosion, as well as under natural expected wind gusts.

As a final remark, the automatic control system for stabilizing both the helicopter and the load would apply final corrections to undesirable motions and keep the aircraft in position, particularly in hover. The Northrup Corporation's Electronics Division and the Sikorsky Aircraft Division have expended much effort in this area, as well as U.S. Army Electronics Command, Fort Monmouth, N.J.

SUMMARY OF INVENTION

The present invention is directed to duct systems to provide wind gust alleviation for helicopters and suspended loads. A sudden wind gust blowing against the side of a large load can make the load sway from side to side. If the load is suspended from a helicopter, there would be a reaction on the aircraft making it difficult if not impossible to handle by the pilot aboard. If the load is being precisely positioned on a platform, a wind gust could make this operation an impossible task.

None of the duct systems described require any external power other than the power provided by the wind itself. For the suspended load, the wind gust blowing against a side is directed by a large overhead duct to the load's opposite side where it is made to blow in a direction to oppose the wind's initial effect on the load. Over one-half of the load's side is covered by an overhanging duct provided with light-weight doors over most of its surface. When the wind blows, the doors, provided with very light torsion springs, immediately open the right amount, and the wind's initial effect is thereby partly dissipated. Pockets in the hinged doors help catch the wind when it may be blowing at an angle from the normal to the door. The wind entering the overhanging duct is directed by an overhead main duct with a minimum of turbulence to the load's opposite side. There it makes impact on that side to oppose the wind's initial effect on the load's reverse side. Should the wind gust blow from the opposite side, the duct work is designed to dissipate the wind in exactly the same manner as described above, since the system is symmetrical about the load's longitudinal centerline.

With respect to the aircraft itself, jackets functioning as ducts are mounted on either side of the fuselage. In one configuration hinged doors as in the load ductwork allow the air to enter and be dissipated downward and to the rear of the aircraft, producing the beneficial effect of lifting the aircraft slightly and pushing it forward while in flight. In another configuration, the hinged doors, also having pockets to catch the air when coming in at an angle, readily open and allow the incoming air to be dissipated upward and downward, forward and rearward, thus permitting the wind gust to have less of an effect on the aircraft's motion. This is desirable when a helicopter pilot wishes to hover in position. Hence, the work load on the aircraft's automatic stabilization system and on the pilot would not only be less but also would be manageable.

The foregoing and further objects, features and advantages of this invention and its utility will be recognized with reference to the foregoing description and appended claims, taken in conjunction with the illustrated embodiments set forth in the accompanying drawings. The jackets attached to the fuselage could be shaped to conform and suit other type vertical take-off aircraft than the Boeing 347 helicopter.

BRIEF DESCRIPTION OF THE DRAWINGS

For the purpose of illustrating the invention, there are shown in the drawings forms thereof which are presently preferred; it being understood, however, that this invention is not necessarily limited to the precise arrangement, instrumentalities and field of utility as therein demonstrated.

FIG. 1 illustrates a plan view of the air duct system supported across the load's width. The load in this case is being suspended longitudinally at the two points 3 and 3'. Arrows indicate the air flow when the wind gust is blowing in the direction indicated.

FIG. 2 illustrates sectional view taken along the lines 2—2 in FIG. 1, showing the rear view of one of the two main air inlets. The air duct system suction-cup supports also are shown.

FIG. 5A is a front view of one configuration of a slightly modified commerically available spring hinge. FIG. 5B is a side view of the hinge.

FIG. 6 illustrates a torsion spring similar to the one included in the hinge of FIG. 5.

FIG. 7 illustrates another configuration of a slightly modified commerically available spring hinge, in which the torsion spring can be replaced by another size. The pintle has been modified to accommodate the external spring.

FIG. 8 illustrates the removable inlet at each end of the air duct system. It shows the swingable door on top and the spring-hinged, cup-shaped doors below.

FIG. 10 illustrates another end view of the air duct system in which spring-hinged doors are shown on the sides of the central duct portion to help reduce the resistance of the center air duct to wind gusts.

FIG. 9 illustrates a sectional view taken along lines 9—9 of FIG. 10. In this view, both ends of the duct system are removable. It also shows the spring hinged doors on one side of the central duct portion.

FIG. 12 shows a top view of two resilient snap-on spades, one on each side of a support post.

FIG. 13 illustrates the side view of the snap-on spades and shows projected buttons properly aligned on a containerized load to which the spades make engagement, as shown.

FIG. 14 illustrates a sectional view taken along lines 14—14 of FIG. 15 of the air duct system, showing the removable inlet assemblies at each end, parabolic-shaped doors for the two main inlets and a bulge or enlargement of the main duct's top central portion to assit in guiding the high velocity air entering at one side into the overhanging outlet duct at the opposite side of a bracketed load. The outlet duct's exterior wall also is bulged.

FIG. 15 illustrates an end view of the air duct system of FIG. 14 in which the spring-hinged doors on the overhanging duct are shown staggered as in FIG. 10. However, now the doors are shaped to flush fit the exterior wall's curved surface of the overhanging duct, so that the doors do not project beyond the duct's exterior surface.

FIG. 21 shows an assembled "Supersonic" fastener by Dzus Fastener Co. The fastener also is shown in FIG. 16.

FIG. 22 shows an assembled "Supersonic" fastener by Dzus Fastener Co., with its stud having an extended shank. The fastener also is shown in FIG. 16.

FIG. 23A shows a typical front view of a hook mounted on the aircraft fuselage.

FIG. 23B illustrates a side view of the hook shown in FIG. 23A.

FIG. 23C shows a front view of a loop hole attached to the top of the duct system section. There is a number of such loop holes to support the duct system as shown in FIG. 24.

FIG. 23D shows a side view of the loop hole.

FIG. 24A illustrates a larger view of the jacket mounted onto the fuselage's exterior wall, showing the hooks, loop holes, studs and the abutment of the forward edge of the jacket against the fuselage surface. In this perspective view a separate section is indicated for each two doors.

FIG. 24B shows a partial enlarged top edge view of jacket with the loops in engagement with hooks.

FIG. 25 shows a perspective view of a typical door stop.

DESCRIPTION OF A PREFERRED EMBODIMENT

Figure 11:
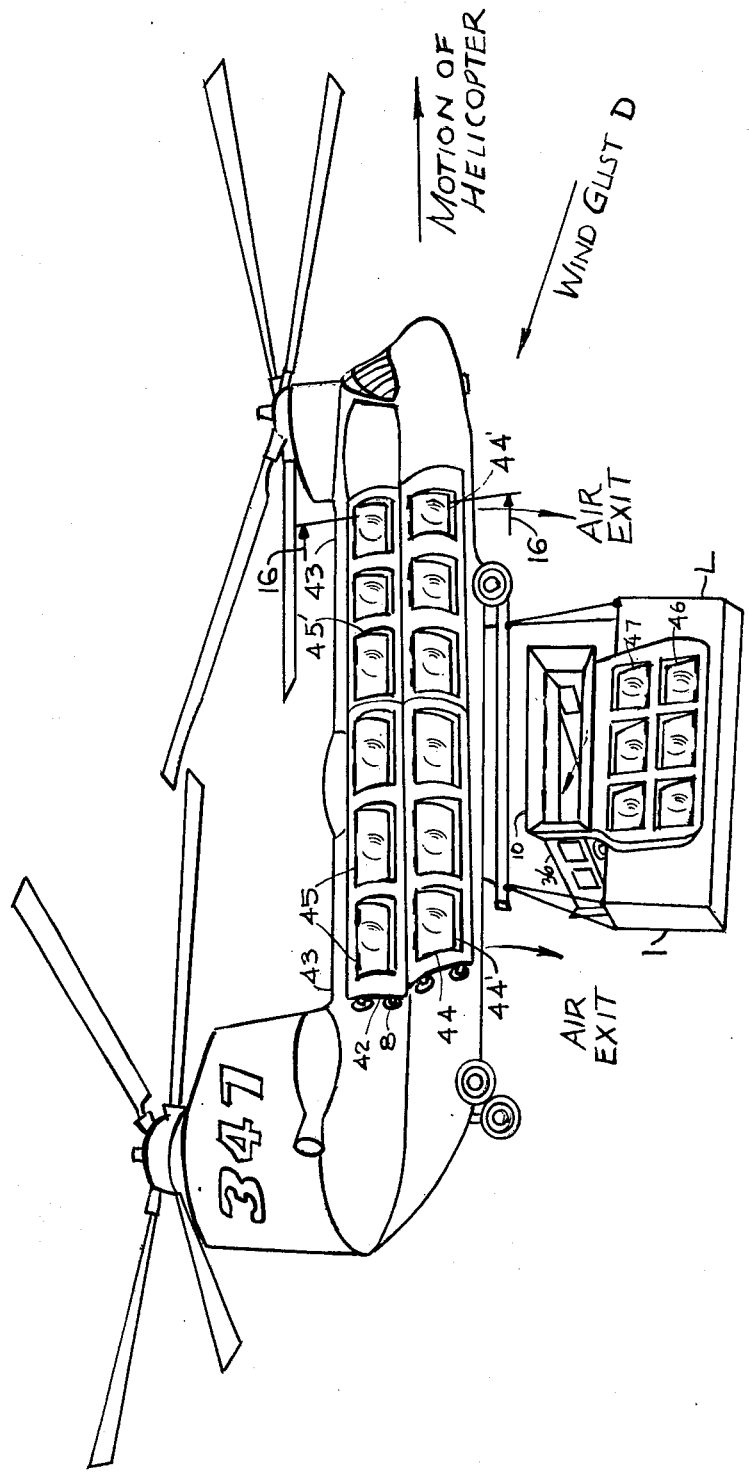
FIG. 11 illustrates an aircraft flying with a slung load and shows the gust alleviation duct system attached to the load. It also shows a gust alleviation jacket attached to the aircraft's fuselage.

Referring now to the drawings, wherein like numerals indicate like elements, FIGS. 1, 2, 3 and 4 illustrate an air-powered gust alleviation system. If a wind gust were blowing approximately normal to the longitudinal side of Load L, it could enter at either of two identical inlets 10 and 10'. Assume it enters at inlet 10. The inlet is contoured, as shown in sectional view taken along 3—3, in order to more smoothly scoop up the air and allow it to flow through duct portions 4 and 5 in a virtually streamlined manner. It should be added that rectangular duct 5 telescopes into duct 4. Inlet 10, expanded inlet 11 and duct 4 form a permanent assembly; likewise 10', 11' and 5 form another assembly. After the wind gust enters 10 and arrives at the other end of the duct, door 14 will be found incapable of opening outward, because of rubber molding 27; hence, the air will follow curvature 32 of duct 5 portion into expanded outlet 15'. Thus, the high velocity air will be forced to make impact on the opposite side 2' of Load L, to oppose the wind's force on side 2.

To assit in dissipating and alleviating the effect of the wind against side 2 and to increase the air flow simultaneously in duct portions 4 and 5, expanded inelt 10 is equipped with six (6) spring-hinged doors 12. These doors open, as shown, with the hinge mounted below each door, allowing the air to enter expanded inelt 11, shown in FIGS. 3 and 8. The amount of the door opening is restricted by stops 80 and 80'. Because of the baffling action of the doors, instead of making impact on side 2, the air is guided and sucked upward by the higher velocity (reduced pressure) air flowing through duct portions 4 and 5, and follows the main air stream to assist in making impact on load side 2'. Also other air surrounding inlet 11 may be drawn into the main air stream of duct 4, since the higher velocity air in duct 4 would present a lower pressure to the air inside inlet 11. To assist the wind gust air being caught and scooped up by the six doors of inlet 11, each door's central part is concave, formed somewhat like a soup spoon. The air naturally flows into these door cavities, encouraging more air to enter inlet 11. The air from these various sources combine to make impact on the load side 2 via outlet 11' to oppose the effects of the wind gust on side 2. Hence, wind power is being utilized to alleviate undesirable wind gust effects on the containerized load.

The duct system shown in FIG. 1 is symmetrical about line 2—2, so that when wind gusts occur in the opposite direction blowing against side 2', an identical air flow pattern results, as described above. In this case, door 14' opens and door 14 keeps closed.

After duct 5 is inserted into slightly large opening of duct 4, the distances of expanded inlets 11 and 11' from load's sides 2 and 2' are adjusted for optimum effectiveness, keeping the two distances equal, in accordance with and determined from experimental studies with different size and weight loads. It is suggested that the expanded inlet cover more than one-half of the load's side area to be effective in gust alleviation.

The duct system is held in place by four or more identical suction cups 8 with lips 8'. The projected or extended flat rubbery lips at the bottom side of each suction cup enables one to lift up the lip and thereby break the partial vacuum existing inside the cup. The cup is initially held in place with the aid of moisture added to the load's top flat surface. It is important that this surface be flat and smooth at the locations of the suction cups in order for this method of support to hold. Another technique is to have the supports flanged at the bottom with a resilient snap-on spade on each side of each support post, as shown in FIGS. 12 and 13. FIG. 13 is the side view of FIG. 12. This technique would then require that the containerized load have two narrow recesses on each side of its top surface with two narrow-necked buttons to receive the spades on each inside of each support post. The spades would face inward toward the center of the air duct system. This snap-slide type fasteners engage when the spades are pushed into the necks 41 and 41' of the buttons 40 and 40'. The two resilient snap-on spades 39 and 39' are shown in FIG. 12. button top 40 projects over spade 39 so that the fasteners cannot disengage without post 6' being pushed backwards in the direction of the arrow shown in FIG. 12.

The duct system should be fabricated of a lightweight glass fiber composition or of a lightweight high-strength aluminum alloy, so as not to add appreciably to the load's weight.

Two configurations of spring-hinges are shown in FIGS. 5 and 7. Both are slightly modified commerical lightweight off-the-shelf hinges. In FIG. 7 the torsion spring can be removed and replaced by one having a different tension and torque value. The torsion spring may be of plastic composition for reduced weight and tension or of lightweight metal. In FIG. 5 the hinge spring tension is fixed but is tension is extremely light. The hinge's two halves are 20 and 23. Half hinge 20 has an extended portion in order to provide stiffness for the door to which it is fastened by screws, rivets or spot welding. In FIG. 5, holes are shown for screws or rivets. It is desirable that these hinges be made of a lightweight but sturdy metal and be protected against corrosion. The suppporting mandrel or arbor for torsion spring 22 in FIGS. 6 and 5 is the hinge pintle. The torsion spring is used in the direction that winds the spring when a wind gust hits the door. In FIGS. 5, 21 may be the pintle head and 26 a nut screwed onto the other end of the pintle. In FIG. 7 two pintle halves 15 and 16 are shown. Hinge 13, a modified commerical item, has elongated half 13' to provide stiffness to the door on which it is mounted. Spring 19 has a rectangular shaped end for support against flat surfaces to provide restoring torque to the door when it has been opened by the wind gust. Spring end 17 has plastic coating 18. Pintle 15 can be removed and spring 19 replaced by a spring having a different torque value. Pintle 15 is staircase shaped to enable spring to be mounted thereon without interference from the support structure 11 or 11'. Various size torsion springs are commercially available from such manufacturers as Associated Spring Corporation, Bristol, Conn. 06010. The springs may be made of lightweight, light torsion elastic metal or be made of an elastic plastic composition.

DESCRIPTION OF ANOTHER PREFERRED EMBODIMENT

Figure 3:
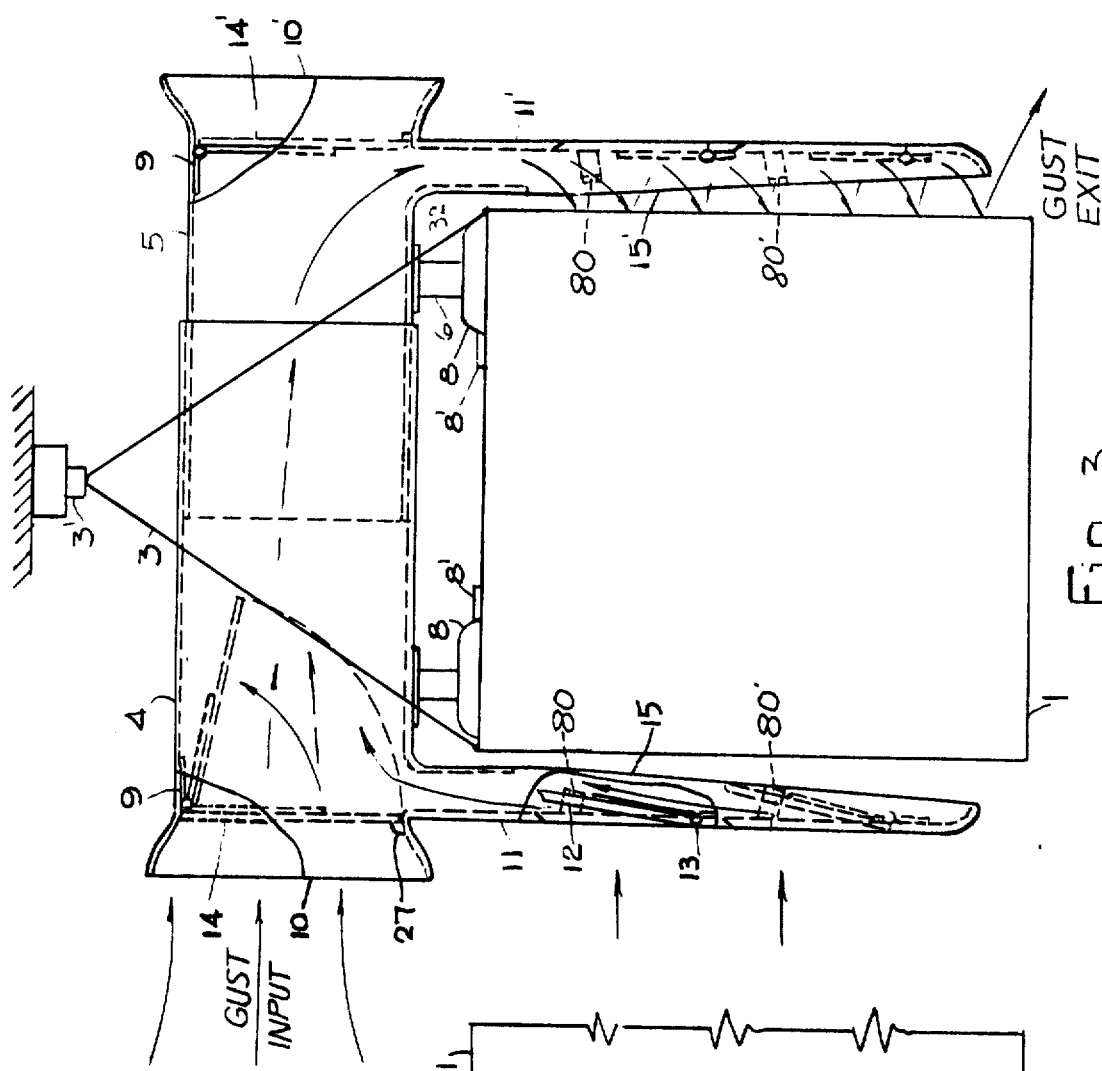
FIG. 3 illustrates a side view of the air duct system, showing two distinct separable parts, the suction cup means of support and the extended inlet-outlets along the load's two opposite sides. Arrows indicate the air flow when the wind is blowing in the direction indicated.
Figure 4:
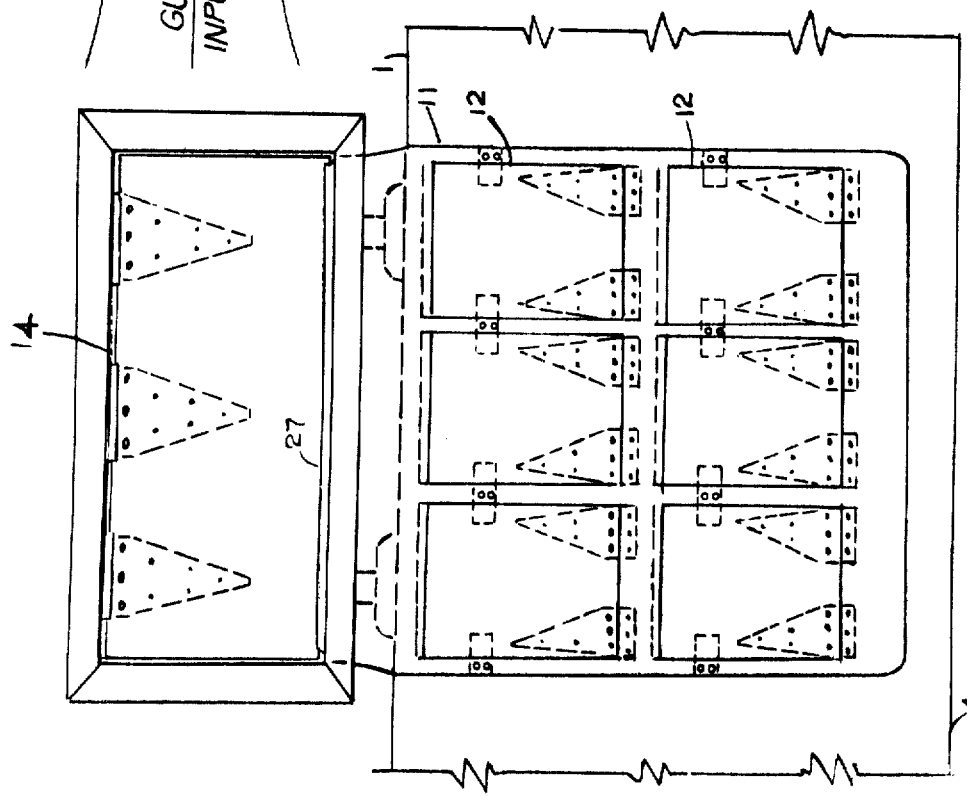
FIG. 4 illustrates an end view of the air duct system showing the main swingable door on top and the spring-hinged doors below on the extended inlet-outlet portion.

FIGS. 9 and 10 are similar to FIGS. 3 and 4. The essential differences are that in FIG. 9, the two inlet ends 10 and 10' are shown removable. In addition, the two sides of the central duct portion have lightweight, light torsion spring-hinged doors 37. These doors do not have spoon-shaped concave recesses like inlet doors 12. The end assemblies 34 and 34' may be held onto the central duct portion 36 by an appropriate number of quick-disconnect fasteners, such as those manufactured by Dzus Fastener Company, Inc. It is desirable to have each end assembly removable from the central duct portion 36 to enable one to place a containerized load more closely between two adjacent similar loads. When the wind blows in the direction of either arrow B or arrow C in FIG. 1 this air duct system can offer resistance to air flow in addition to the containerized load. In order to make the central air duct less of an obstruction to air flow, hinged doors 37 open inward allowing the air to pass through. The air blows out at the two outlets 15 and 15'. FIG. 8 illustrates an enlarged sectional view of the removable air inlet assembly 34, as shown in FIG. 9. Quick-disconnect fastener 33 holds flange portion 32 of air inlet duct 34 to central duct portion 36. Fasteners 33 enable one to quickly unfasten each end assembly 34 and 34' from the central duct portion of the duct system. The central duct can be easily removed by pulling up on the extended flat lips 8' of suction cups 8, thereby breaking the partial vacuum existing inside each cup. "Spoon-shaped" cavities are shown on spring-hinged doors 29. These cavities help scoop up the wind gust while opening inward with little effort by the force of the impact. Their openings are limited by stops 81 and 81'. This air is then drawn upward by the higher velocity air passing through the main duct via inlet 10. Very little of the wind gust's energy is absorbed by the very lightweight sturdy hinged door 14. Padding can be placed underneath main duct 36 at the location where door 14 might slam against as the result of the wind gust.

DESCRIPTION OF STILL ANOTHER PREFERRED EMBODIMENT

FIGS. 14 and 15 illustrates the preferred embodiment and are similar to FIGS. 9 and 10. The essential differences are that in FIG. 14 main inlet doors 53 and 53' are now parabolic-shaped and the main duct's top wall 48 has a convex curved bulge to assist and direct high velocity air entering inlet 10 to flow around door 53' into outlet area 54'. Baffle 49 and 49' representing a continuation of curved wall 48 also contribute to guiding the air flow into outlet area 54'. When gust A occurs, baffle 49' provides an extension of curved wall 48 in order to direct air flow around 53' into exit 54'. Air leaving 54' is assited by curved protrusions 55' and 56' of doors 52' and 50' and by duct end 57' to make impact on opposite side 2' of bracketed Load L, and thus partially counteract wind gust's impact on load's side 2. End assemblies 34 and 34' have overhanging duct portions and show external walls 51 and 51' to have convex curved surfaces. Convex curved walls and surfaces enable a slightly greater volume of space to exist between the outer walls 51 and 51' and Load L surfaces 2 and 2', respectively. Thus, when doors 50 and 52 open inward as a result of wind gust A, more space and distance exists between the doors' interior surfaces and Load L exterior surface 2.

When wind gusts occur on the load's opposite side 2', the reverse occurs from that described above. A wind gust in the direction E causes hinged door 53' to open inward and the resulting high velocity air follows contour of main duct 28, including baffle 49, curvature of door 53 into exit area 54. Bulges 55 and 56 in doors 52 and 50, respectively, and cut end 57 assist in enabling the resulting high velocity air to pound against load side 2, thus having the effect of counteracting wind gust's impact on load side 2'. As in FIG. 9, doors 50, 50', 52 and 52' have spring hinges and have spoon-shaped depressions to scoop up the wind gust.

As in FIG. 9, when the wind gust occurs, doors 50, 50', 52 and 52', on the overhanging ductwork are pushed inward and open just the right amount by stops located in their path. There is at least one stop 82 and 82' for each door. The springs on the door hinges provide very little torsion, just enough to enable each door to close and remain so when the wind is not blowing against it. For the same size door, door 50 is capable of opening a greater distance than door 52. Door 52 opens less in order to cause less interference to air coming up from door 50. The same would be true for doors 50' and 52' on the opposite side of Load L. Doors 50 and 50' are shown staggered below door 52 and 52', respectively, in order that the aforementioned interference be even less.

APPLICATION OF THE TECHNIQUE TO THE HEAVY LIFT AIRCRAFT

FIG. 11 illustrates the Boeing 347 helicopter flying with a slung load and shows the gust alleviation duct system attached to the load. It also shows a gust alleviation jacket attached to the aircraft's fuselage. The load is being supported by a two-point fore-and-aft slung load suspension. In this suspension system the load is more apt to swing laterally than longitudinally as the aircraft moves forward. The principal causes for the load swinging laterally are wind gusts and sudden lateral motions of the aircraft itself. When unloading the cargo from a hovering aircraft, two winches in its hatch lower the cargo onto a waiting platform below. If a fore-and-aft wind exists during this unloading task, then the aircraft tilts its tip-path plane so that the rotor' horizontal components of thrust will oppose and just balance the wind force. If the tip-path plane is incapable of tilting sufficiently, then the entire aircraft may be required to tilt to balance out wind forces. But the aircraft and its slung load cannot conveniently take care of laterally occurring wind gusts; and the loading of a ship, for example, is considerably hampered. As the cables are extended during the unloading operation, the task of attempting to introduce restoring moments by the aircraft itself to reduce wind gust effects on the load becomes even more difficult, if not impossible. The purpose of the duct system supported on Load L, FIG. 11, is to alleviate the effects of laterally occurring wind gust both while the load is being transported and while it is being loaded onto a ship or an awaiting platform below. The purpose of lightweight jacket 42, mounted onto the two opposite side of the fuselage, shown in FIG. 11, is to assist in alleviating the effects of lateral wind gusts on the aricraft, as sudden aircraft motions caused thereby could compound the unloading task by introducing additional swaying motions to the cargo. When the wind blows against the jacket's spring-hinged doors, the doors are pushed inward but are limited in the maximum amount of opening by stops 83 and 83', one for each door. Being that the doors are hinged on top, the air entering the jacket is directed downward. In accordance with the laws of physics, a high downward air velocity would have the effect of assiting the aircraft in supporting the load, and no detrimental effects would result. The jacket 42 is held on to the fuselage 43 by suction cups 8, or by quick-disconnect fasteners. For convenience in mounting, the jacket may be constructed of two pieces and dove-tailed together on assembly to aircraft fuselage 43.

FIG. 11 shows a vertical separation 60 between left and right portions of the jacket, each portion including six (6) doors. Concerning separation 60 shown in FIG. 11, intermediate to the ends of the jacket 42, the dove-tailing consists of an S-shaped pocket so formed by a "button punch lock" machine manufactured by Lockformer Company, Lisle, Illinois. Similar to the doors 12 of the load duct system, the doors 44 of jacket 42 also have "spoon-shaped" depressions to catch and scoop up the air as well as to assist in directing it downward when doors 44 open upon the impact of wind gust D.

For the same door size, door 45' is capable of opening a greater distance than door 44'. Both doors 44' and 45' are limited in the amount that can be opened by stops. Door 44' is permitted to open less than door 45' in order that door 44' may cause less interference to air entering and being expelled downward by 45'. In addition, doors 44' may be staggered below doors 45' so that they would offer less obstruction to high velocity air flowing down from doors 45' as a result of wind gust D, similar to the doors shown in FIG. 10.

Figure 16:
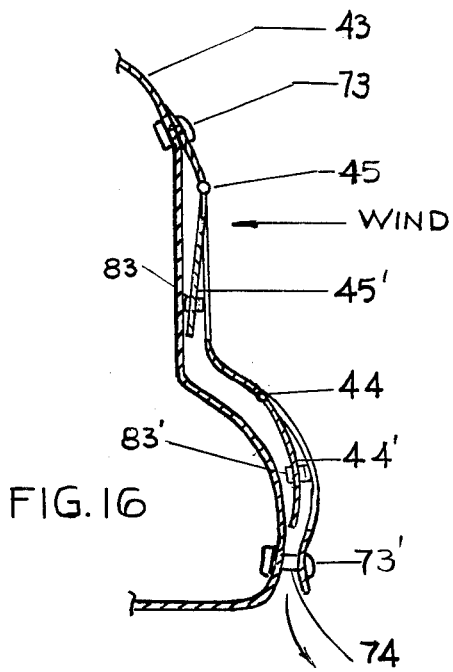
FIG. 16 is a partial sectional view taken along lines 16—16 of FIG. 11, showing the top side of the jacket butted against the surface of the fuselage, and showing the bottom side with an opening for allowing incoming air to be expelled out.
Figure 17A:
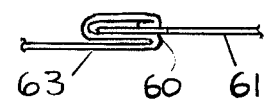
FIG. 17A illustrates how two sections of sheet metal may be joined together. An S-shaped sheet metal pocket is shown on one section with the flat edge of another section inserted into the aforementioned pocket.
Figure 17B:
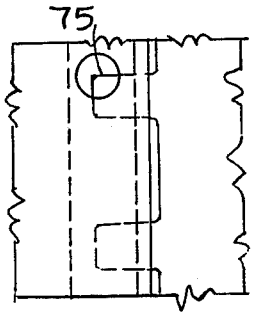
FIG. 17B shows the front view of the joint shown in FIG. 17A with the flat portion having only the projections or tongues extended into the S-shaped sheet metal pocket.
Figure 20:
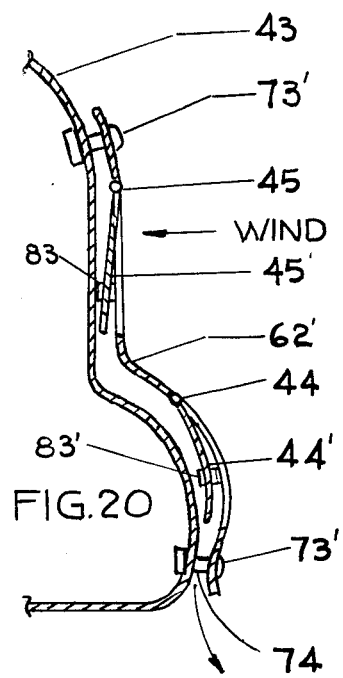
FIG. 20 illustrates a partial sectional view taken along lines 16—16 of FIG. 11 showing both the top and bottom sides of the jacket provided with openings so that inside air can be expelled both upward and downward, respectively.
Figure 18:
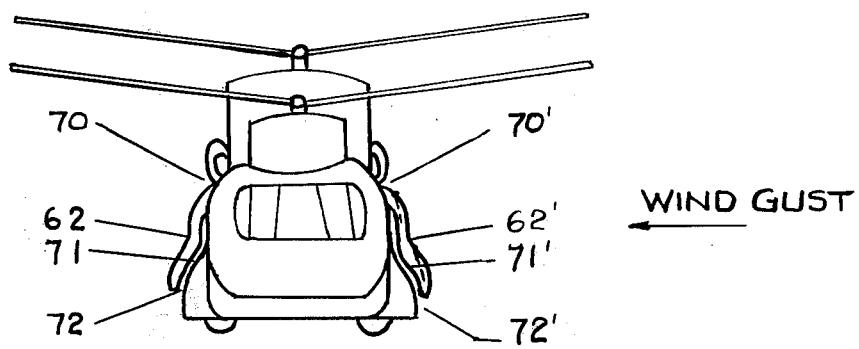
FIG. 18 shows the front view of the aircraft illustrated in FIG. 11. Openings in the duct system at the front, top and bottom sides are shown.
Figure 19:
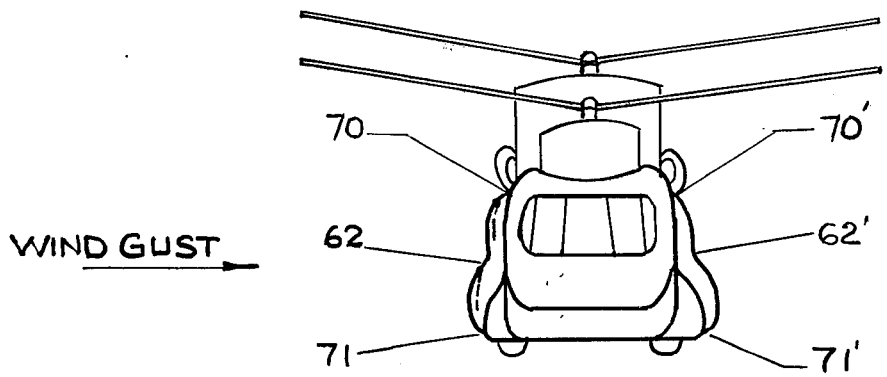
FIG. 19 shows the front view of the aircraft illustrated in FIG. 11. An opening is shown at the bottom side, while the duct's top edge is shown butted against the fuselage.

Jacket 42, consisting of two parts or sections, is held on the fuselage 43, as shown in FIGS. 18, 19, 16, by an appropriate number of quick-disconnect fasteners, such as those manufactured by Dzus Fastener Company, Inc. FIG. 17A shows a seam 60 consisting of an S-shaped pocket portions 63 and a straight portion of sheet metal 61. First the rear section of the jacket 42 is mounted onto the side of the fuselage 43 and held in place by quick-disconnect fastens at top and bottom edges of the section. Then the forward section of jacket 42 is mounted on to the side of fuselage 43. This is accomplished by first inserting straight portion 61 into S-shaped pocket portion 63. Then the forward section is held firmly in place by means of quick-disconect fasteners, as shown in FIG. 16. Although only two sections are indicated and shown, jacket 42 may be divided into as many sections as desired to enable as few as two men to put up each section conveniently and easily. In FIG. 17B, a front view of the S-shaped sheet metal pocket is shown. It should be noted that flat portion 61 has only projections 75 extended into the S-shaped sheet metal pocket. These projections enable the assembly to be performed more easily and quickly than if the flat portion were continuous. The forward edge of forward sections 61 and 61' as well as their top sides are butted onto the fuselage in one configuration of jacket 42, as shown in FIG. 19. FIG. 18 shows a front view of the helicopter and an end view of the duct system with side openings 70, 71, 72 and 70', 71',72' in jacket 42. The opening along the upper edge of jacket 42 is identified by numeral 70 and 70'. The opening along the front edges of jacekts 42 between the exterior surface of the fuselage and the duct frame's interior wall is identified by numeral 71 and 71'. The opening along the lower edge of jacket 42 between the fuselage's exterior surface and the duct's interior wall is identified by numerals 72 and 72'. In this configuration of the air duct system, openings for expelling incoming air occur at all four sides of jackets 42, although most of the air entering jacket by way of doors 44' and 45' would be expelled along the lower sides or edges of the jackets, as shown in FIG. 20.

FIG. 19 shows a front view of the helicopter and an end view of the duct system mounted on to the fuselage's exterior. Air openings 71 and 71' are shown which occur along the two jackets' entire lower sides. Openings also occur along the jacekts' rear sides, as shown in FIG. 11. The front and upper edges of both jackets 42 are sealed. In both configurations of the duct system, the upper and lower portions with reference to center line 62 are held in place by means of quick disconnect fasteners, such as those made by Dzus Fastener Company, Inc. Referring to FIG. 16, the quick disconnect fasteners are shown at 73 and 73'. There are an appropriate number of these fasteners installed along the upper and lower edges of jackets 42. Collar 74 provides an air space at bottom of jacket 42 between the fuselage's exterior surface and the inner surface of the jacket. Referring to FIG. 20, the quick disconnect fasteners are shown at 73' to provide air spaces at both the upper and lower edges of the jacket, identified by numerals 70 and 72. The jacket, having appreciable weight, even though fabricated of lightweight metal or fiber glass, could be removed under calm weather conditions. It can be quickly installed on gusty days when the cargo's weight aboard the aircraft can tolerate the additional weight of the jackets. If not, the helicopter probably would not be flown. Should jacket 42 be fabricated of fiber glass, the dovetailing between the left and right sides or sections of the jacket, in particular the S-shaped portion 52, would be performed by a different process. Although just two sections 48 and 52 have been suggested for jacket 42, for a large aircraft four or more separate sections may be desirable in order that the weight of each section may be conveniently handled and fitted on to the fuselage by one or two men.

It is obvious that since most of the wind gust is expelled downward by hinged doors, another beneficial effect is that this downward motion of air would counteract and reduce the aircraft rotor's blowing of dust at hover, at dusty landing pads under gusty conditions. In addition, the jackets' presence has the effect of increasing the radius of gyration about the fuselage's longitudinal axis, thus reducing the overturning effect of the craft while landing under gusty conditons. Suggested fasteners for connecting jacket 42 to fuselage 43 are shown in FIGS. 21 and 22. FIG. 21 shows an assembled standard fastener called "Supersonic" manufactured by Dzus Fastener Co. The parts are identified as oval head stud 90, panel 91 of duct system, support 92, receptacle 93, spring cap 94, pin 95 and rivet 96. FIG. 22 shows a fastener identical to the one in FIG. 21, except for the longer shank of stud 90 to enable the open space denoted by 1 between the two panels 91 and 92 to exist. Spacer 74 separates panel 91 from support 92, which is part of fuselage 43.

Another scheme for supproting jacket 42 on the fuselage surface is shown in FIGS. 23A, 23C and 24A. In this scheme, the jacket's top edge has equally-spaced loop holes 102, shown in FIG. 23C, and the fuselage wall has identically equally-spaced hooks 104. the hok consists of a disc 99 welded to a stand off member 100 having a threaded stud so that nut 101 could hold the assembly in place. A lock washer should be placed between nut 101 and support 92. Loop hole 102 is held to jacket 42 by means of rivets 103.

Jacket 42 is shown assembled on fuselage 43, FIG. 24A. The jacket's top edge has hooks 104 which engage loop holes 102. Several vertical sections 103 are indicated in FIG. 24. A suggested mounting procedure is to assemble the most forward section 105 first by fitting loop holes 102 over hooks 104. The top edge of jacket is now closely fitted to the fuselage's exterior wall so that air leakage from within is not appreciable. Next, the jacket's bottom edge is fastened to the fuselage wall by means of Dzus quick-disconnect fasteners 73' which permit an air space to exist between the jacket's bottom edge and the fuselage's exterior wall. The air space enables incoming air to be expelled out, as shown in FIG. 16. Then the duct's front edge is fastened to the fuselage by means of Dzus fasteners 73, which enable the front edge of section 105 to be butted against the fuselage wall. Next, adjacent section 110 is mounted on the fuselage in a manner similar to that described for section 105. It has its adjacent edge slightly overlapping the edge 111 of the forward section, to avoid air leakage, without protrusion, as shown in FIG. 24B. There are no fasteners indicated between adjacent sections, although fasteners may be used to avoid noise caused by vibrations transmitted from the fuselage. A likely location for additional fasteners is at midway denoted by numeral 62. As shown, intermediate sections are fastened only on top and on the bottom edge. However, the final rear section would be held in place by fasteners not only at the top and bottom but also along the rear edge. The rear would stand off from the fuselage wall by fasteners 73′, shown in FIG. 22, to allow incoming air to be expelled out through this rear opening. The fasteners would be spaced closely enough to maintain good rigidity of the jacket with respect to the fuselage panel and stringers, if any. Although only three fasteners are shown at the top and at the bottom of each section in FIG. 24A, more may be used to assure that the jackets are firmly held.

A perspective view of a typical hinge-door stop is shown in FIG. 25. The stop limits the amount of door opening by the distance d. The metal bracket is reinforced at bends 106 and 106′ for rigidity. Flat portion 108 is fastened to the duct wall by means of screws or rivets. Flat portion 109 stops the door from opening further. A rubber grommet is located at 107 to soften the door's blow against the stop. Door stop, shown in FIG. 25, conceivably could be fabricated with a longer metal strip to include two additional bends so that an additional flat portion similar to 109 could exist to the right of flat portion 108. In this way one stop could limit the amount of opening of two doors. These additional bends have been indicated in FIGS. 4, 10, and 15.

In an alternate approach to hanging the jackets, the hooks may be placed on top of the doors and the recesses placed within the fuselage to receive the hooks. Using recesses instead of hooks attached to the fuselage, there would be less wind resistance offered when the aircraft is in flight. Also this approach can place the top edge of the jacket more closely against the aircarft fuselage.

What is claimed is:

1. An air duct system for mounting onto each exterior side of an aircraft's fuselage and having an exterior wall and an interior on each exterior side of said fuselage and supported by and spaced away from the surface of said fuselage so that air can flow between said duct system exterior walls and said surface, said walls shaped to follow contour of said surface, said walls having openings over most of their area and being fitted with doors having spring-hinges mounted above said doors and said doors capable of opening inward only into the interior of said duct system, said system having top, bottom, forward and rear sides and having openings on said sides for expelling air entering said system interior so that when a wind gust blows against the side of said fuselage said doors open and said system allows the air entering to be blown out through said sides, the majority of said air being blown out through said bottom side by virtue of said hinges being mounted above said doors, and said duct system provided with means for fastening onto the surface of said fuselage.

2. An air duct system as in claim 1, wherein both said forward sides and said top sides of said air duct system are butted onto said fuselage so as to block air flow between said forward and top sides and the surface of said fuselage; whereby, air entering the air duct system can exit only through said bottom and rear sides, providing additional lift and forward motion for said aircraft, respectively.

3. An air duct system as in claim 1, wherein said spring-hinged doors have spoon-shaped depressions in order to more effectively scoop up said wind gust, when said gust is blowing at an angle from the normal to said doors.

4. An air duct system as in claim 1, wherein stops are mounted on said duct system wall in the path of each said door for limiting the amount of said opening inward into the interior of said duct system.

* * * * *

UNITED STATES PATENT OFFICE
CERTIFICATE OF CORRECTION

Patent No. 3,960,144      Dated June 29, 1976

Inventor(s) Edwin Zenith Gabriel

It is certified that error appears in the above-identified patent and that said Letters Patent are hereby corrected as shown below:

Figures 3 and 4 should be deleted and substituted with the attached figures therefor.

Signed and Sealed this

First Day of March 1977

[SEAL]

Attest:

RUTH C. MASON  
*Attesting Officer*

C. MARSHALL DANN  
*Commissioner of Patents and Trademarks*